US008956660B2

(12) United States Patent
Launag et al.

(10) Patent No.: US 8,956,660 B2
(45) Date of Patent: Feb. 17, 2015

(54) PRODUCTION OF NANOPARTICLES, ESPECIALLY NANOPARTICLE COMPOSITES, FROM POWDER AGGLOMERATES

(75) Inventors: Thomas Launag, Voerde (DE); Thomas Sawitowski, Essen (DE); Bärbel Gertzen, Emmerich (DE); Ulrich Nolte, Kleve (DE)

(73) Assignee: BYK-Chemie GmbH, Abelstrasse (DE)

( * ) Notice: Subject to any disclaimer, the term of this patent is extended or adjusted under 35 U.S.C. 154(b) by 1312 days.

(21) Appl. No.: 12/294,709

(22) PCT Filed: Feb. 14, 2007

(86) PCT No.: PCT/EP2007/001270
§ 371 (c)(1),
(2), (4) Date: Apr. 6, 2009

(87) PCT Pub. No.: WO2007/112805
PCT Pub. Date: Oct. 11, 2007

(65) Prior Publication Data
US 2010/0034857 A1 Feb. 11, 2010

(30) Foreign Application Priority Data

Mar. 29, 2006 (DE) .......................... 10 2006 014 786
Jun. 2, 2006 (DE) .......................... 10 2006 025 848

(51) Int. Cl.
*A61K 9/16* (2006.01)
*C09D 7/12* (2006.01)
*C08J 3/20* (2006.01)
*C09D 5/03* (2006.01)
*B01J 2/10* (2006.01)
*C08J 3/22* (2006.01)
*B02C 13/12* (2006.01)
*C08K 9/08* (2006.01)

(52) U.S. Cl.
CPC .............. *B01J 2/10* (2013.01); *C09D 7/1291* (2013.01); *C08J 3/20* (2013.01); *C09D 5/033* (2013.01); *C09D 7/1266* (2013.01); *C08J 3/226* (2013.01); *B02C 13/12* (2013.01); *C09D 7/1275* (2013.01); *C09D 5/03* (2013.01); *C08K 9/08* (2013.01); *Y10S 977/783* (2013.01); *Y10S 977/773* (2013.01)
USPC .......................... 424/490; 977/783; 977/773

(58) Field of Classification Search
None
See application file for complete search history.

(56) References Cited

U.S. PATENT DOCUMENTS

| 4,022,749 | A | * | 5/1977 | Kuechler | ....................... 523/319 |
| 4,285,994 | A | | 8/1981 | Pearce et al. | ................... 427/222 |
| 5,474,803 | A | | 12/1995 | Kikuchi | ........................ 427/180 |
| 2004/0018109 | A1 | * | 1/2004 | Blatter et al. | .................... 419/32 |
| 2009/0004489 | A1 | * | 1/2009 | Laiho et al. | ..................... 428/461 |

FOREIGN PATENT DOCUMENTS

| DE | 42 44 254 A1 | 7/1993 | ................ B29B 9/16 |
| EP | 0 471 463 A2 | 2/1992 | ................ C08J 3/20 |
| EP | 1 323 769 A2 | 7/2003 | ............... C08J 3/205 |
| EP | 1 637 216 A1 | 3/2006 | ................ B01F 3/18 |
| GB | 1 507 691 | 4/1978 | |

OTHER PUBLICATIONS

Nam et al. (Dynamics of steady and unsteady melt spinning, 23 Ind. Eng. Chem. Fundam. 1 (1984).*
Asbestos, available at http://ces.iisc.ernet.in/energy/HC270799/HDL/ENV/enven/vol313.htm, last accessed on Jun. 27, 2011.*
Polypropylene, available at http://www.polymerprocessing.com/polymers/PP.html, last accessed on Jun. 27, 2011.*
Nam (Dynamics of steady and unsteady melt spinning, 23 Ind. Eng. Chem. Fundam. 1 (1984).*
Polypropylene, available at http://www.polymerprocessing.com/polymers/PP.html, last accessed Dec. 6, 2011.*
Asbestos, availabe at http://ces.iisc.ernet.in/energy/HC270799/HDL/ENV/enven/vol313.htm, last accessed Dec. 6, 2011.*
English translation of International Preliminary Report on Patentability from PCT/EP2007/001270, 7 pgs. (Nov. 21, 2008).

* cited by examiner

*Primary Examiner* — H. Sarah Park
(74) *Attorney, Agent, or Firm* — Brannon Sowers Cracraft PC

(57) ABSTRACT

The invention relates to a method for producing particulate composite materials. According to the method, solid inorganic or organic particle agglomerates or particle aggregates that are provided in a dry state, particularly in powder form, are first reduced in size in the gas phase or in a gaseous carrier medium in the presence of organic matrix particles by applying energy. The obtained comminuted particles are dispersed into the organic matrix particles, especially embedded thereinto and/or attached thereto. The composite materials produced in said manner can be used in many different ways and are suitable in particular for use in a large variety of plastic materials, coating materials, paints, and lacquers, especially coating powders, to modify properties during use in the corresponding products and similar.

13 Claims, 1 Drawing Sheet

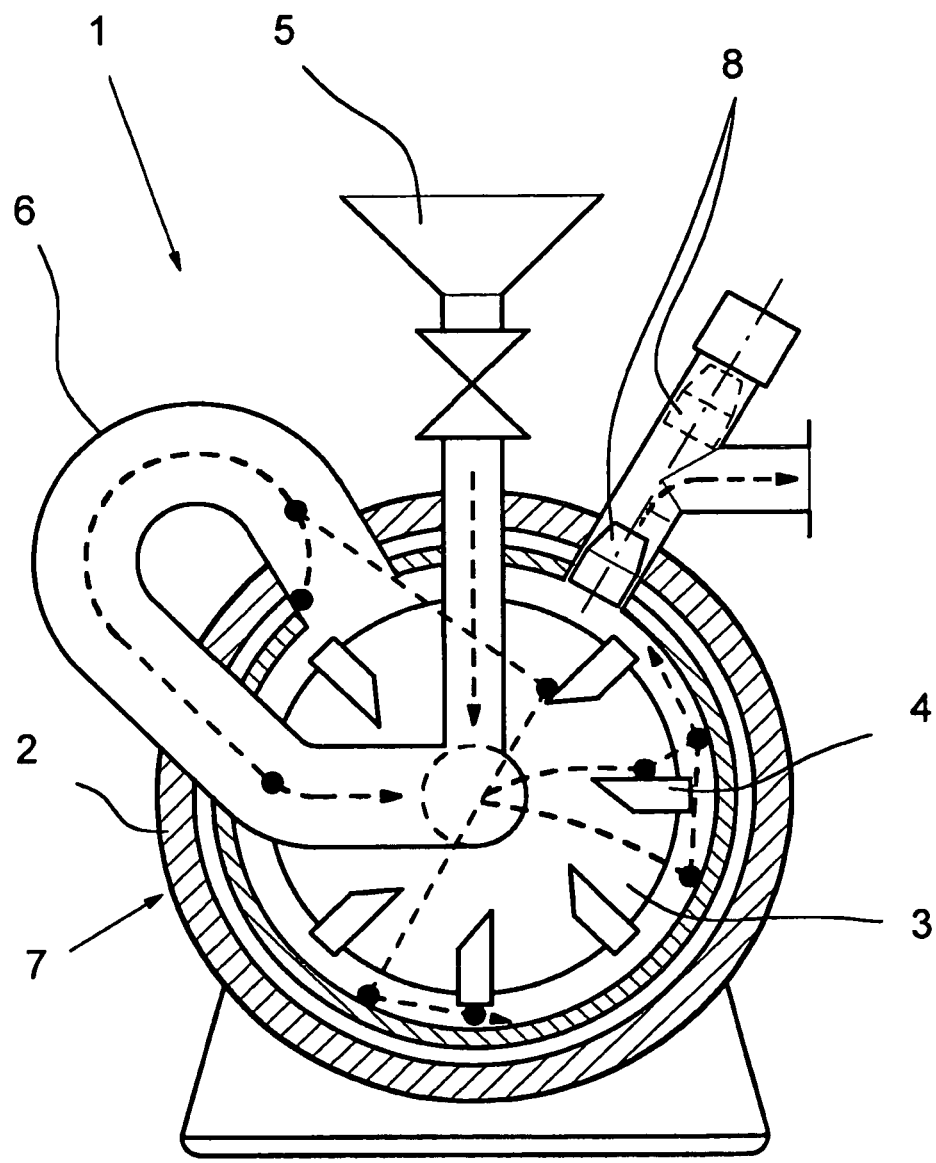

PRODUCTION OF NANOPARTICLES, ESPECIALLY NANOPARTICLE COMPOSITES, FROM POWDER AGGLOMERATES

CROSS REFERENCES TO RELATED APPLICATIONS

This application is a National Stage filing of International Application PCT/EP2007/001270, filed Feb. 14, 2007, claiming priority to German Application No. DE 10 2006 014 786.3, filed Mar. 29, 2006 and to German Application No. DE 10 2006 025 848.7, filed Jun. 2, 2006, entitled "PRODUCTION OF NANOPARTICLES, ESPECIALLY NANOPARTICLE COMPOSITES, FROM POWDER AGGLOMERATES". The subject application claims priority to PCT/EP2007/001270 and to German Application Nos. 10 2006 014 786.3 and DE 10 2006 025 848.7, all of which are expressly incorporated by reference herein, in their entireties.

BACKGROUND OF THE INVENTION

The present invention relates to production of nanoparticles, especially nanoparticle composites, from powder agglomerates or powder aggregates.

The present invention relates more particularly to a process for producing preferably particulate composite materials, more particularly comprising generally inorganic and organic constituents, and also to the composite materials thus produced and their use.

The generation of composite materials in which the continuous phase is composed of an organic polymer or another meltable organic compound and the discontinuous phase, dispersed in the organic phase, is composed of generally inorganic or else organic particles represents a problem which in technical terms has not been solved in all of its component aspects.

On account of the large surface area of mesoscopic particles, these particles adhere to one another by electrostatic and/or van der Waals forces and form agglomerates and aggregates. These agglomerates and aggregates can be separated from one another again only by means of relatively high input of energy. In this case use is made, for example, of methods such as ultrasound; techniques with assistance from grinding media; roll mills; or various extruders. In many cases, however, the transfer of the energy from the dispersing assembly to the agglomerates or aggregates is limited in that the energy introduced is partly absorbed by the matrix particles and converted into heat. More particularly in melts and liquids of high viscosity this represents an enormous difficulty in the generation of homogeneous particle composites containing few or no agglomerates and/or aggregates.

Known from the prior art are processes, for example, in which organically modified particles (e.g., organophyllosilicates) are dispersed into polyolefins or polyamides, for example, with the use, for example, of chemical modifications, etc. In this case the modification leads to compatibilization with the matrix and so facilitates incorporation into the polymer. In other cases the synthesis of the particles takes place in such a way that, on account of their surface chemistry and surface charge, they are easily dispersed in polymer melts. In other cases still, the particles are generated in situ (e.g., by chemical precipitation of, for example, inorganic particles in organic media).

There are also processes known from the prior art with which micrometer-sized or else millimeter-sized particles can be dispersed into polymers, with disruption and dispersing of the agglomerates taking place by means of impact energy, for example.

U.S. Pat. No. 5,474,803 A describes the use of this process for generating polymer composites from two or more materials, a first component of relatively large particle diameter and relatively low softening point being surface-modified with a second component of higher softening point.

U.S. Pat. No. 6,403,219 B1 describes the generation of polymer composites by means of a growth reaction of acicular particles on the surface of a support material.

U.S. Pat. No. 6,090,440 A describes the generation of composites by exposure to impact forces and subsequent chemical reaction of the shell particles.

Common to all of the documents cited above is the generation of composites in which the materials used to modify the support are likewise composed of polymers or else must be constructed by means of a chemical reaction.

It is an object of the present invention to provide an efficiently operating process for the production or generation of preferably particulate composite materials. At the same time the process is more particularly to allow trouble-free dispersing of a discontinuous, organically or inorganically based phase in a continuous phase composed more particularly of at least one organic polymer and/or oligomer or of another meltable organic compound, and, advantageously, is intended to avoid at least largely, or else at least attenuate, the above-elucidated problems of the prior art.

To achieve the aforementioned object, the present invention proposes a process as disclosed herein. Further subject matter of the present invention are the composite materials obtainable by the process of the invention and their use. Also disclosed is a method of comminuting particle agglomerates or aggregates and of producing stable nanoparticles.

BRIEF SUMMARY

The invention relates to a method for producing particulate composite materials. According to the method, solid inorganic or organic particle agglomerates or particle aggregates that are provided in a dry state, particularly in powder form, are first reduced in size in the gas phase or in a gaseous carrier medium in the presence of organic matrix particles by applying energy. The obtained comminuted particles are dispersed into the organic matrix particles, especially embedded thereinto and/or attached thereto. The composite materials produced in said manner can be used in many different ways and are suitable in particular for use in a large variety of plastic materials, coating materials, paints, and lacquers, especially coating powders, to modify properties during use in the corresponding products and similar.

BRIEF DESCRIPTION OF THE DRAWING

FIG. 1 is a diagrammatic illustration in partial section of a rotor/stator processor for agglomerates according to the present disclosure.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

The present invention accordingly provides—in accordance with a first aspect of the present invention—a process for producing particulate composite materials, in which, first of all, solid inorganically or organically based particle agglomerates or particle aggregates present in the dry state, more particularly in powder form, are comminuted in the gas phase (i.e., in a gaseous carrier medium or reaction medium) and in the presence of organically based matrix particles, with input of energy, and subsequently the resulting comminuted particles are dispersed in situ into the organically based matrix particles, being more particularly attached thereto and/or incorporated therein.

The concept of the gas phase, for the purposes of the present invention, means that the solid particle agglomerates or aggregates (i.e., those present in the solid aggregate state) are transferred to a preferably inert, gaseous carrier medium or reaction medium (e.g., air, nitrogen-enriched air, nitrogen, etc.) (in the form, for example, of a fluid bed or of a fluidized bed, as described below), more particularly by "atomization" or "nozzle introduction" of the solid particle agglomerates or particle aggregates, after which they are then—as described above—comminuted in the gaseous carrier medium ("gas phase") with input of energy, followed by dispersion in situ of the resulting comminuted particles into the likewise present and also solid (i.e., present in the solid aggregate state) organically based matrix particles, with the result overall of a dispersing operation in solid phase; the concept of the gas phase as used in the context of the present invention refers, therefore, not to the aggregate state of the particle agglomerates or aggregates or of the matrix particles (which are indeed both present in the solid aggregate state), but rather to the carrier medium in which the aforementioned operations (i.e., comminuting and dispersing) take place.

In the context of the process of the invention, therefore, the inorganically or organically based particle agglomerates or particle aggregates used as starting materials are deagglomerated or deaggregated, respectively, to form smaller, stable nanoparticles or nanopowders and subsequently in situ— before reagglomeration or reaggregation can occur—are dispersed into the organically based matrix particles also present, at which point both attachment and incorporation take place.

The process of the invention then covers both an embedding operation and a coating operation: The comminuted, inorganically or organically based particles are attached by the introduced energy to the surface of the matrix particles and are embedded therein. Subsequent further input of energy produces further deformation, so that the particles for incorporation are enclosed, in some cases completely, by the matrix particles and are incorporated therein. Furthermore, as a result of the input of energy, there is a deformation, more particularly plastic deformation, of the organically based matrix particles and also of the resultant composite materials; more particularly, irregularly shaped particles are rounded as a result of plastic deformation, this being an advantage for subsequent use in the corresponding end products.

In the context of the present invention, therefore, success has been achieved for the first time in an efficient way in incorporating inorganically or organically based nanoparticles into organically based matrix particles homogeneously and/or with very fine division, in the context of a dry dispersing or solids dispersing operation in the solid phase.

In principle the process of the invention can be carried out under any desired pressures. In accordance with the invention it is preferred to operate at atmospheric or ambient pressure. Nevertheless, the invention does not in principle rule out operation under reduced pressure ("vacuum" or "underpressure") or at elevated pressure ("overpressure").

Generally speaking, the input of energy is chosen such that the initial particle agglomerates or aggregates are comminuted or deagglomerated or deaggregated, in terms of their size, by a factor of at least 10, preferably at least 50, preferably at least 100, more preferably at least 1000. Generally speaking, the input of energy is accomplished by introduction of impact forces and/or shearing forces, preferably impact forces and shearing forces.

The total energy input over the process duration may vary within wide ranges. Generally speaking, the total energy input over the process duration is 10 to $10^6$ kJ, more particularly $10^2$ to $10^6$ kJ, preferably $10^2$ to $10^5$ kJ.

Advantageously the process of the invention is carried out in a fluid bed or as a fluidized-bed process. As described above, there is in this case a dry dispersing operation, more particularly a powder dispersing operation, in the solid phase ("solid-phase dispersing operation" or "powder dispersing operation"). In this case, so to speak, the gas phase or the gaseous carrier medium takes the form of a fluid bed or fluidized bed. Subject matter of the present invention in accordance with this particular embodiment is therefore a process for producing particulate composite materials, in which, first of all, solid inorganically or organically based particle agglomerates or particle aggregates present in the dry state, more particularly in powder form, are comminuted in a fluid bed or in a fluidized bed and in the presence of organically based matrix particles, with input of energy, and subsequently the resulting comminuted particles are dispersed in situ into the organically based matrix particles, being more particularly attached thereto and/or incorporated therein.

Advantageously the process of the invention can be carried out in a device of the stator/rotor type. Devices suitable in accordance with the invention are sold by, for example, the Nara Machinery Co. Ltd., Europe branch, Frechen, Germany, under the name "hybridizer" or "NHS".

The single FIGURE shows a schematic section through an inventively useful device of the stator/rotor type. According to the depiction in the FIGURE, the device 1 has not only a stator 2 and a rotor 3 but also at least one impact plate 4, preferably a multiplicity of impact plates 4, for the purpose of comminuting the agglomerates or aggregates on their impact on the impact plates 4. For the purpose of introducing the agglomerates or aggregates into the device there is in general an inlet 5, more particularly a powder inlet. For the purpose of recycling particles that are exited from the rotor chamber 3 during the process, there is generally a recycle line 6. Furthermore, the device 1 may have a double-walled housing 7, which may be equipped such that it can be cooled and/or heated. Finally, the device 1 generally also has a closable outlet 8 for the removal or withdrawal of the products produced. The line, dashed in the depiction of the FIGURE, in the interior of the device 1 shows by way of example the course of a single particle in the device 1 in the case of its impact.

Generally speaking, the device used in accordance with the invention is operated with a peripheral rotor speed of 50 to 120 m/s, more particularly 70 to 100 m/s, preferably in the case of a rotor diameter of 100 to 1.000 mm.

The process duration may vary over wide limits. Generally speaking, the process duration varies in the range from 0.01 to 20 minutes, more particularly 0.1 to 10 minutes, preferably 0.5 to 5 minutes, more preferably 1 to 3 minutes.

As far as the starting agglomerates or aggregates are concerned, their average particle sizes may vary within wide ranges. Generally speaking, the average particle sizes of the starting agglomerates or starting aggregates are above 0.1 µm, more particularly above 0.2 µm, preferably above 0.5 µm. Generally speaking, the starting agglomerates or starting aggregates have average particle sizes in the range from 0.1 to 2.000 µm, more particularly 0.2 to 1.500 µm, more preferably 0.5 to 1.250 µm, very preferably 1 to 1.000 µm.

The concept of the average particle size as used in the context of the present invention relates, in the case of spherical or approximately spherical particles, to their average diameter. In the case of other particle morphologies (e.g., rodlets or tubelets), it relates to the average size in one dimension (e.g., in the case of elongated rodlets or tubelets, for example, to their length or else to their width).

The resulting comminuted particles generally have average particle sizes below 500 nm, more particularly below 200 nm, preferably below 100 nm. More particularly the particles obtained by comminution of the starting agglomerates or aggregates have average particle sizes in the range from 1 to 500 nm, more particularly 10 to 200 nm, preferably 20 to 100 nm. On the basis of these dimensions, the comminuted particles are occasionally referred to in the context of the present invention as nanoparticles or nanopowders, which are subsequently dispersed in situ into the organically based matrix particles.

As far as the average particle size of the organically based matrix particles is concerned, it too may vary in wide ranges. Generally speaking, the organically based matrix particles have average particle sizes in the range from 0.1 to 500 µm, more particularly 0.5 to 100 µm, more preferably 1 to 50 µm.

Advantageously, however, the ratio V of the average particle diameter of the organically based matrix particles, $D_{50\ (matrix\ particles)}$, on the one hand, to the average particle diameter of the comminuted particles, $D_{50\ (comminuted\ particles)}$, on the other hand, is at least 10:1, more particularly at least 15:1, preferably at least 20:1, i.e., thus:

$$V = D_{50(matrix\ particles)} / D_{50(comminuted\ particles)} \geq 10:1,$$
more particularly $\geq 15:1$, preferably $\geq 20:1$ As far as the proportion of organically based matrix particles, on the one hand, to comminuted particles which are incorporated or are to be incorporated into the matrix particles, on the other hand, is concerned, it too may vary within wide ranges. Generally speaking, the proportion of organically based matrix particles, on the one hand, to comminuted particles dispersed therein, on the other hand, varies in the range from 99.9:0.1 to 30:70, more particularly 90:10 to 40:60, preferably 80:20 to 50:50.

As far as the organically based matrix particles are concerned, they may be selected from meltable organic compounds. More particularly the organically based matrix particles may comprise or consist of at least one organic oligomer or polymer. It is equally possible for the organically based matrix particles to comprise or consist of mixtures of different oligomers and/or polymers, which more particularly are compatible with one another. Examples of suitable matrix materials for the organically based matrix particles are, for example, thermoplastic polymers, waxes, resins and also mixtures thereof. Equally suitable in accordance with the invention are other meltable organic compounds as well (e.g., meltable organic monomers, such as ε-caprolactone or its lactam, carboxylic esters and diesters, such as dimethyl terephthalate, phenol-based esters and diesters, etc.).

Nonrestricting examples of polymers which can be used for the organic matrix particles and support particles are, for example, thermoplastic polymers, more particularly poly(meth)acrylates, polyacrylonitrile, polystyrene, styrenic polymers (e.g., ABS, SEBS, SBS), polyesters, polycarbonates, polyethylene terephthalate (PET), polybutyl terephthalate, polyamides, thermoplastic polyurethanes (TPU), polyvinyl chloride, polyoxymethylene, polyolefins, such as polyethylene or polypropylene, etc. The thermoplastics may be filled and/or pigmented. Thermoplastics for the purposes of the present invention also include mixtures (blends) of different kinds of thermoplastics. More particularly it is possible to use polyolefins, such as polyethylene (e.g., LDPE, HDPE, etc.) and polypropylene (PP), polyvinyl chloride (PVC), polystyrene (PS), polycarbonate (PC), polymethyl methacrylate (PMMA), acrylonitrile/butadiene/styrene graft copolymer (ABS), polyamide (PA), polyoxymethylene (POM) and ethylene/propylene/diene elastomer (EPDM), and also blends of the thermoplastics listed. Thermoplastics such as polyethylene (e.g., LDPE, HDPE, etc.), polypropylene (PP), polyvinyl chloride (PVC), polystyrene (PS), polycarbonate (PC), polymethyl acrylate (PMMA), acrylonitrilelbutadiene/styrene graft copolymer (ABS), polyamide (PA), polyoxymethacrylate (POM), ethylene/propylene/diene elastomer (EPDM), and polyvinyl acetate (PVAc), and also mixtures (blends) of the thermoplastics listed, are particularly preferred.

Further nonrestricting examples of materials which can be used for the organic matrix particles and/or support particles are, for example, organic resins, such as epoxy resins, COOH polyester resins, (e.g., saturated or unsaturated), OH polyester resins (e.g. saturated and unsaturated), OH acrylic resins, polyester polyols, polyether polyols, glycidyl acrylate resins, ethylene/vinyl alcohol copolymers, polyamides (e.g., polyamide 11 or 12), tetrahydroxyalkylbisamides, triglycidyl diisocyanurate, dicyandiamides, isocyanate adducts, dodecanedicarboxylic acid, etc.

Still further nonrestricting examples of materials which can be used for the organic matrix particles and/or support particles are, for example, organic waxes, such as natural waxes (e.g. animal, plant, and fossil waxes), such as beeswax (lanolin), carnauba waxes, Candelilla waxes, paraffin waxes, microcrystalline waxes, and montan waxes, semisynthetic waxes, such as montan wax esters (fatty acid+alcohol) and amide waxes (fatty acid+amide), and also synthetic waxes, more particularly homopolymers, such as polyethylene (PE), polypropylene (PP), polyamide (PA), polytetrafluoroethylene (PTFE), Fischer-Tropsch waxes, and waxes based on polyvinyl acetate (PVAc), or copolymers, such as ethylene-vinyl acetate (EVA) or ethylene-acrylic acid (EAA) and also mixtures (blends) of the waxes listed.

Still further nonrestricting examples of materials which can be used for the organic matrix particles and/or support particles are other meltable organic compounds, such as meltable organic monomers (examples being the aforementioned compounds), for example.

The organically based matrix particles generally have a melting point or melting range above 0° C. Generally speaking, the melting point or melting range of the organically based matrix particles is situated within the temperature range from 30 to 350° C., more particularly 40 to 330° C., preferably 70 to 160° C.

Generally speaking, the organically based matrix particles possess a glass transition temperature, Tg, above −60° C. The glass transition temperature of the organically based matrix particles is situated preferably in the range from −60 to 200° C., more particularly −40 to 150° C., preferably −30 to 60° C.

The selection of the aforementioned melting points or melting ranges and glass transition temperatures for the organically based matrix particles leads to particularly good results in the context of the production of the composite materials of the invention.

Generally speaking, the organically based matrix particles (i.e., the polymers and/or oligomers of which they are composed) possess an average molecular weight above 300 g/mol. Generally speaking, the average molecular weight of the organically based matrix particles (i.e., to be more precise, of their constituent polymers and/or oligomers) is situated in the range from 300 to 30.000 g/mol, more particularly 500 to 10.000 g/mol.

Advantageously the organically based matrix particles are designed such that they are plastically deformable at least on their surface under process conditions and preferably are plastically deformable overall under process conditions.

Generally speaking, the process of the invention is carried out below the melting temperature or melting range of the organically based matrix particles. Additionally the process of the invention can be carried out in general and in principle below or above the glass transition temperature of the organically based matrix particles; it is preferred, however, to operate above the glass transition temperature of the organically based matrix particles (but at the same time below the melting temperature or melting range), since in that case the particles to be dispersed are able to penetrate more effectively and/or easily into the surface of the matrix particles. The process is likewise carried out below the melting temperature of the inorganically or organically based particle agglomerates or particle aggregates. The result, therefore, as described above, is a dispersing operation in the solid phase ("solids/solids dispersing" or "solid-phase dispersing"), i.e., not only the particles to be dispersed but also the matrix particles are present as solids, or are in the solid aggregate state, under process conditions.

The temperatures at which the process of the invention is carried out may vary within wide ranges. Generally speaking, the process of the invention is carried out at temperatures in the range from 0 to 80° C., more particularly 5 to 50° C., preferably 10 to 40° C., more preferably 15 to 35° C.

As far as the nature of the particle agglomerates or aggregates used is concerned, they may in principle be organic or inorganic in nature. In accordance with the invention it is preferred, however, to use inorganically based particle agglomerates or aggregates; in this case, materials referred to as hybrid materials, comprising organic and inorganic constituents, are obtained, since, in this case, inorganic nanoparticles or nanopowders are incorporated into organically based matrix particles.

As particle agglomerates or aggregates it is possible, for example, to use metals and/or semimetals and also mixtures or alloys of different metals and/or semimetals. Equally it is possible to use oxides, hydroxides, carbides, nitrides, sulfides, tellurides, selenides, halides, carbonates, phosphates, sulfates, silicates, borates, and/or aluminates of metals and/or semimetals. Equally it is possible to use mixtures of the aforementioned compounds. It is likewise possible to use what are called mixed compounds of the aforementioned kind as starting particle agglomerates or aggregates. Preference in accordance with the invention is given more particularly to inorganic oxides and mixed oxides, such as aluminum oxide (for the modification of mechanical properties, such as scratch/abrasion resistance, etc., for example), titanium dioxide (e.g., for UV protection), zinc oxide (e.g., for W protection, for a bacteriocidal or fungicidal action, etc.), cerium dioxide (e.g., for UV protection, etc.), for example, and mixtures thereof.

Examples of materials which can be used in accordance with the invention for the starting agglomerates or aggregates are—for example and nonrestrictingly—silicates, boehmites, talc, CNT, carbon nanofibers, Alosil, ZnO, titanium dioxide, iron oxides, magnetite, iron, cobalt, nickel, silver, phyllosilicates, magnesium hydroxide, ATH, pigments, ATO, ITO, fluorescent materials, aluminum oxide, zirconium oxide, diamond, cerium dioxide, UV phosphors, up-converters, IR pigments, silasesquioxanes, POSS, calcium carbonate, ZnS, barium sulfate, boron nitride (BN), tungsten carbide (WC), etc.

A further example of a material for the discontinuous phase, i.e., for the starting agglomerates or aggregates, is, for example, carbon, in the form for example of graphite, diamond, fullerenes, etc., in granular or fiber form, for example, in rodlet or tube form, etc., hence in the form, for example, of single-wall or multiwall tubes.

Examples of organic starting agglomerates and aggregates which can equally be used in principle are, for example, melamine particles, despite being less preferred than the inorganically based materials for the discontinuous phase to be dispersed in the matrix particles.

As outlined above, the morphology or external form of the starting particle agglomerates or aggregates used is not critical. For example it is possible to employ granular or particulate or else spherical to ellipsoidal particle agglomerates or aggregates. Equally, however, it is possible to employ agglomerates with a rodlet or tube form.

Further subject matter of the present invention—in accordance with a second aspect of the present invention—are the particulate composite materials which are obtainable by the process of the invention as described above.

These materials are more particularly particulate composite materials which are present preferably in the form of a powder and have inorganically or organically based particles having average particle sizes of 1 to 500 nm, which are preferably dispersed homogeneously or in very finely divided form into organically based matrix particles having average particle sizes of 0.1 to 500 µm, being more particularly attached thereto and/or incorporated therein. The average particle size of the organically based matrix particles, $D_{50(matrix\ particles)}$, is generally at least 10 times, more particularly at least 15 times, preferably at least 20 times, the average particle diameter of the comminuted particles, $D_{50(comminuted\ particles)}$.

For further details in respect of the particulate composite materials of the invention it is possible, in order to avoid unnecessary repetitions, to refer to the above remarks relating to the process of the invention, which also apply mutatis mutandis in respect of the particulate composite materials of the invention.

The present invention therefore serves more particularly for the production of polymer particle composites having particle sizes in the stated range, on the basis of a dry dispersing operation using a device of the stator/rotor type, more particularly a mechanical hybridizer (e.g., from Nara Machinery Co. Ltd., Europe Branch, Frechen, Germany), as described above.

The process of the invention permits, for example, the production of polymer composites through the dry grinding of two or more powders with utilization of mechanical impact forces and shearing forces. This procedure succeeds, entirely unexpectedly, in disrupting the high particle interactions in the particle agglomerates, in dispersing the particles, and hence in obtaining, in a very efficient way, virtually agglomerate-free composites having filler contents of up to more than 50%.

The present invention thus provides a process for generating nanoparticle composites by dispersing, for example, two or more powder components in a fluidized-bed process. The resultant powders are nanocomposites in which the nanoparticles are present in very finely divided form, with a very low degree of agglomeration, in or on an organic support.

The process of the invention makes it possible to provide a satisfactory solution for the first time to all of the component aspects of the problem of generating composite materials in which the continuous phase is composed of a polymer (such as a polyolefin, polyester, polyamide, PVC, polystyrene, polysiloxane, polyacrylate, etc., for example) or of an oligomer (such as polyethers, waxes, etc., for example) or of another support material having a melting point above, typically, 0° C. (e.g., relatively long-chain hydrocarbons, etc.) and the discontinuous phase is composed of inorganic or organic particles (e.g., metals or semimetals, metal or semimetal oxides, nitrides, carbides, carbonates, hydroxides, sulfides, etc.) which are generally smaller in at least one dimension, more particularly smaller than 0.5 µm, preferably smaller than 0.2 µm, ideally between 1 nm and 100 nm.

In the context of the process of the invention it is possible to separate agglomerates or aggregates in which, owing to the high surface area of mesoscopic particles, these particles adhere to one another with electrostatic and/or van der Waals forces, this separation being efficient as a result of the relatively high energy introduced, and then to attach and/or incorporate these separated agglomerates or aggregates, in the deagglomerated or deaggregated state, onto or into the matrix particles, thereby enabling the generation of homogeneous particle composites which are free from or at least low in agglomerate.

Through input of energy, more particularly introduction of impact forces and shearing forces, there is first a disruption of the agglomerates to form stable nanoparticles, which are subsequently dispersed in situ into the matrix particles. It is surprising that, in accordance with the invention, the nanoparticles can be produced stably from the agglomerates and aggregates and subsequently dispersed into the matrix. Indeed, it is essential here that the surface area of particles in the millimeter range, of the kind used in the prior art, are smaller by a factor of $1000^4$ to $1000^3$ than that of nanoparticles having a diameter of smaller than 100 nm; even micrometer-sized particles possess a surface area which is smaller by a factor of $1000^2$ to 1000 than that of the mesoscopic particles stated here. The surface energy and hence the forces of adhesion are a function in turn of the specific surface area. Accordingly they are likewise greater by a multiple in the case of particles smaller than 100 nm in comparison to millimeter- or micrometer-sized particles. Hence the dispersing more particularly of particles smaller than 100 nm imposes particular requirements on the surface chemistry of the particles and the performance of apparatus.

The present invention now makes it possible to disperse particles having the stated size homogeneously in meltable organic supports at levels of up to more than 50%. The result is a composite material which is composed of a deagglomerated particle powder and an organic support and in which the particles are present dispersed in virtually agglomerate-free form and distributed homogeneously in and on the polymer particles.

A further subject of the present invention—in accordance with a third aspect of the present invention—is the inventive use of the particulate composite materials according to the present invention, as defined herein. Thus the particulate composite materials of the invention can be used, for example, in coating compositions, paints and inks of all kinds (e.g., in powder coating materials, printing inks, leather inks, and textile inks and also paper slips), in molding compounds, in cosmetic preparations and in plastics (such as thermoplastics, thermosets or elastomers, for example). By way of example the particulate composite materials can be used as a masterbatch or base mix for incorporation into products, more particularly for the purpose of changing the properties of products. Generally speaking it is possible for this purpose to use the particulate composite materials of the invention in amounts of 0.1% to 10% by weight, more particularly 0.5% to 5% by weight, preferably 1% to 3% by weight, based on the end products.

Hence the composites of the invention can then be incorporated in turn, in known processes, into organic matrices, employing low shearing forces, and in this way can function as what are called masterbatches. It is also possible for the composite materials themselves to be used directly in a wide variety of applications, without necessarily being further mixed with organic materials.

Through the process of the invention and the subsequent further processing it is possible to achieve significant changes in the properties of organic matrices: thus the incorporation of materials such as ZnO, titanium dioxide, iron oxide or cerium dioxide, for example, leads to improved stability with respect to UV radiation.

When biocidal materials are used, such as silver, silver compounds, copper oxides, etc., it is possible to produce composites which are actively protected against bacterial, algal, fungal and/or yeast growth. By introduction of, for example, carbon tubes (e.g., single-wall or multi-wall), carbon fibers, conductive oxides or metals, it is possible to produce conductive composites having good antistatic or true conductive qualities.

Where, for example, materials are incorporated such as aluminum oxide, silica, phyllosilicates, talc, boehmite, carbon dust, calcium carbonate, barium sulfate, etc., it is possible to enhance mechanical properties such as toughness, stiffness, Young's modulus, impact strength, etc.

The composite materials produced by the process of the invention permit a large number of very different applications in a very wide variety of sectors.

By way of example the composite materials produced by the process of the invention are suitable for application in thermoplastics, thermosets, elastomers, such as polyolefins, for example, such as polyethylene (e.g., LDPE, HDPE, etc.) or polypropylene (PP), polyvinyl chloride (PVC), polystyrenes (PS), polycarbonates (PC), polymethyl methacrylate (PMMA), acrylonitrile/styrene graft copolymers (ABS), polyamides (PA), polyoxymethylene (POM), unsaturated polyesters (UP), epoxy resins (EP), melamine resins (MF), phenolic resins (PF), polyurethanes (PUR), ethylene/propylene/diene elastomers (EPDM), and also commercially customary blends of the aforementioned polymers.

The composite materials produced by the process of the invention are suitable, furthermore, for application in powder coating materials, such as polyester powders, hybrid (polyester/EP) powders and acrylate powders, in aqueous, organic-solventborne or solvent-free paints, printing inks, paper slips, leather and textile inks, molding compounds, cosmetic preparations, and the like.

The composite materials produced by the process of the invention are suitable, furthermore, for changing properties in the context of their use in relation to the products to which they are added, in relation, for example, to flame retardancy, UV protection, magnetism, IR adsorption, product protection, (gas) barrier effect, surface polarity, coatability, mechanical properties, nonslip properties, bacteriocidal effect, algicidal effect, fungicidal effect, action against yeasts, tribological properties, scratch resistance/abrasion resistance, antistatic properties, rheological properties, flow behavior, dispersibility, stabilization of non-nanoscale fillers, etc.

A further subject matter of the present invention, finally—in accordance with a fourth aspect of the present invention—is a method of comminuting particle agglomerates or particle aggregates and/or of producing stable nanoparticles by subjecting solid, inorganically or organically based particle agglomerates or particle aggregates which are present in the dry state, more particularly in powder form, having average particle sizes above 0.1 µm, more particularly in the range from 0.1 to 2.000 µm, to comminution in the gas phase or in a gaseous carrier medium, with input of energy, to give nanoparticles having average particle sizes below 500 nm, more particularly in the range from 1 to 500 nm. In contradistinction to the process of the invention according to the first aspect of the present invention, this method variant entails the comminution of the starting agglomerates or aggregates not in the presence of organically based matrix particles, so that there is no subsequent dispersing of the resultant nanoparticles. Apart from this, it is possible, concerning further details relating to the fourth aspect of the present invention, and in order to avoid repetition, to make reference to the above remarks concerning the process of the invention according to the first aspect of the present invention, which apply mutatis mutandis in relation to the fourth aspect of the present invention.

Further embodiments, modifications and variations in the present invention are readily apparent and realizable for the skilled worker on reading the description, without departure from the scope of the present invention.

The present invention is illustrated with reference to the exemplary embodiment below, which is not, however, intended to restrict the present invention in any way.

Exemplary Embodiments

Inventive Production of Composite Particles with UV Protection Properties

Example 1A

LDPE powder is dispersed in a Nara NHS-1 (Nara Hybridization System) stator/rotor device with 30% zinc oxide particles of NanoTec® ZH type at 8000 rpm for 2 minutes. Subsequently 2% by weight of these nanocomposites is used in the production of a PE extrudate, from which films are produced. Subsequent analysis by electron microscopy shows, in comparison to processes of the prior art (i.e., use of pure, uncomminuted powder), a markedly reduced number and size of agglomerates/aggregates. This advantage is apparent in an increase in the transparency of the PE films, with a simultaneous improvement in UV absorption.

Example 2A

In the same way, a polyester powder is dispersed with the aforementioned Nara NHS-1 stator/rotor device with 30% of zinc oxide of the NanoTec® ZH type at 6000 rpm for one minute. Subsequently 2% by weight of these nanocomposites is used in the production of a pigmented powder coating material and coatings are produced therewith. Subsequent analysis by electron microscopy shows, in comparison to processes of the prior art (i.e., use of pure, uncomminuted powder), a significantly reduced number and size of agglomerates/aggregates. This advantage is manifested in an improved UV absorption.

Inventive Production of Composite Particles for Modifying or Enhancing the Scratch Resistance of Coatings Example 1B CERA-Wax Ceraflour® 988 is dispersed with the aforementioned Nara NHS-1 stator/rotor device with 50% of Nanodur® aluminum oxide at 6000 rpm for 1 minute. Subsequently 4% by weight of these inventive nanocomposites (identified below as "T-23") is used in a 100% UV system (solvent-free) based on an aromatic epoxide acrylate.
Formulation:

| | |
|---|---|
| Laromer ® 8986 | 57.3 parts by weight |
| DPGDA ® | 28.7 parts by weight |
| Irgacure ® 500 | 4.0 parts by weight |
| inventive compound T-23 or alternatively Ceraflour ® 988 | 4.0 parts by weight |
| TPGDA | 6.0 parts by weight |

Raw Materials:

| | |
|---|---|
| aromatic epoxy resin Laromer ® LR 8986/BASF | binder |
| tripropylene glycol diacrylate TPGDA/BASF | reactive diluent |
| dipropylene glycol diacrylate DPGDA/BASF | reactive diluent |
| Irgacure ® 500/Ciba | photoinitiator |

The binder is weighed out together with the reactive diluents and the photoinitiator, and the components are mixed by stirring with a dissolver for five minutes.

The inventive compound (T-23) and Ceraflour® 988 are incorporated in each case by means of a dissolver (toothed disk d=4 cm) by stirring at 930 rpm for 10 minutes.

After storage in the dark overnight, the samples, after brief agitation, are applied using a 25 µm wire-wound doctor blade to a black Plexiglas sheet (16 cm×43 cm).
UV Curing:
2×120 W/cm, transit speed 5 m/min
Testing:
10 double rubs with steel wool 00
10 double rubs with steel wool 0000
Result:

| visual assessment to DIN 53230 (1 = good (no scratches) to 5 = poor (heavily scratched)): (steel wool 00/0000) | |
|---|---|
| control | 5/5 |
| Ceraflour ® 988 | 2-3/2-3 |
| T-23 | 1-2/2 |

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:
1. A process for producing particulate composite materials, said process comprising the process steps of:
(i) first subjecting solid, inorganically or organically based particle agglomerates or particle aggregates which are in a dry state to comminution in a gaseous phase or in a gaseous carrier medium and in the presence of organically based matrix particles, with input of energy, and (ii) subsequently dispersing the resulting comminuted particles into the organically based matrix particles, thereby attaching them thereto and incorporating them therein, wherein:

the input of energy is accomplished by introduction of impact forces and shearing forces, the total energy input over the process duration is 10 to $10^6$ kJ, the proportion of organically based matrix particles, on the one hand, to comminuted particles dispersed therein, on the other hand, varies in the range from 99.9:0.1 to 30:70, the process is carried out as a dry dispersing operation in solid phase, the process being carried out below the melting temperature or the melting range and above the glass transition temperature of the organically based matrix particles and below the melting temperature of the inorganically or organically based particle agglomerates or particle aggregates, and the process is carried out in a fluidized bed in a stator/rotor device, wherein the device comprises, in addition to stator and rotor, a multiplicity of impact-plates for the comminution of the agglomerates or aggregates on their impact, wherein the starting agglomerates or starting aggregates have average particle sizes in the range from about 0.1 μm to about 2,000 μm, wherein the comminuted particles have average particle sizes in the range of from about 1 nm to about 500 nm, wherein the organically based matrix particles have average particle sizes in the range of from about 0.1 μm to about 500 μm.

2. The process of claim 1, wherein the input of energy is such that the particle agglomerates or particle aggregates are comminuted in their size by a factor of at least about 10.

3. The process of claim 1, wherein the total energy input over the process duration is in the range of from about $10^2$ to about $10^6$ kJ.

4. The process of claim 1, wherein the device is operated with a peripheral rotor speed of from about 50 to about 120 m/s in the case of a rotor diameter of from about 100 to about 1,000 mm.

5. The process of claim 1, wherein the process is carried out in total for a duration of from about 0.01 to about 20 minutes.

6. The process of claim 1, wherein the ratio V of the average particle diameter of the organically based matrix particles, $D_{50(matrix\ particles)}$, on the one hand, to the average particle diameter of the comminuted particles, $D_{50(comminuted\ particles)}$, on the other hand, is at least about 10:1.

7. The process of claim 1, wherein the proportion of organically based matrix particles, on the one hand, to comminuted particles dispersed therein, on the other hand, varies in the range from about 90:10 to about 40:60.

8. The process of claim 1, wherein the organically based matrix particles have a melting point or melting range in the range of from about 30° C. to about 350° C.

9. The process of claim 1, wherein the organically based matrix particles have a glass transition temperature Tg in the range of from about −60° C. to about 200° C.

10. The process of claim 1, wherein the organically based matrix particles have a weight-average molecular weight in the range of from about 300 g/mol to about 30,000 g/mol.

11. The process of claim 1, wherein the organically based matrix particles are such that they are plastically deformable at least on their surface under process conditions.

12. A process for producing particulate composite materials, said process comprising the process steps of:

(i) first subjecting solid, inorganically or organically based particle agglomerates or particle aggregates which are in a dry state to comminution in a gaseous phase or in a gaseous carrier medium and in the presence of organically based matrix particles, with input of energy; and (ii) subsequently dispersing the resulting comminuted particles into the organically based matrix particles, thereby attaching them thereto and incorporating them therein, wherein:

the input of energy is accomplished by introduction of impact forces and shearing forces, the total energy input over the process duration is 10 to $10^6$ kJ, the proportion of organically based matrix particles, on the one hand, to comminuted particles dispersed therein, on the other hand, varies in the range from 99.9:0.1 to 30:70, the process is carried out as a dry dispersing operation in solid phase, the process being carried out below the melting temperature or the melting range and above the glass transition temperature of the organically based matrix particles and below the melting temperature of the inorganically or organically based particle agglomerates or particle aggregates, and the process is carried out in a fluidized bed in a stator/rotor device, wherein the device comprises, in addition to stator and rotor, a multiplicity of impact-plates for the comminution of the agglomerates or aggregates on their impact, wherein the process is carried out in total for a duration of from about 0.01 to about 20 minutes, wherein the organically based matrix particles have a melting point or melting range in the range of from about 30° C. to about 350° C., wherein the organically based matrix particles have a glass transition temperature Tg in the range of from about −60° C. to about 200° C., wherein the starting agglomerates or starting aggregates have average particle sizes in the range from about 0.1 μm to about 2,000 μm, wherein the comminuted particles have average particle sizes in the range of from about 1 nm to about 500 nm, wherein the organically based matrix particles have average particle sizes in the range of from about 0.1 μm to about 500 μm.

13. A process for producing particulate composite materials, said process comprising the process steps of:

(i) first subjecting solid, inorganically or organically based particle agglomerates or particle aggregates which are in a dry state to comminution in a gaseous phase or in a gaseous carrier medium and in the presence of organically based matrix particles, with input of energy; and (ii) subsequently dispersing the resulting comminuted particles into the organically based matrix particles, thereby attaching them thereto and incorporating them therein, wherein:

the input of energy is accomplished by introduction of impact forces and shearing forces, the total energy input over the process duration is 10 to $10^6$ kJ, the proportion of organically based matrix particles, on the one hand, to comminuted particles dispersed therein, on the other hand, varies in the range from 99.9:0.1 to 30:70, the process is carried out as a dry dispersing operation in solid phase, the process being carried out below the melting temperature or the melting range and above the glass transition temperature of the organically based matrix particles and below the melting temperature of the inorganically or organically based particle agglomerates or particle aggregates, and the process is carried out in a fluidized bed in a stator/rotor device, wherein the device comprises, in addition to stator and rotor, a multiplicity of impact-plates for the comminution of the agglomerates or aggregates on their impact, wherein the starting agglomerates or starting aggregates have average particle sizes in the range from about 0.1 μm to about 2,000 μm, wherein the comminuted particles have average particle sizes in the range of from about 1 nm to about 500 nm, wherein the organically based matrix particles have average particle sizes in the range of from about 0.1 μm to about 500 μm, wherein the ratio V of the average particle diameter of the organically based matrix particles, $D_{50(matrix\ particles)}$, on the one hand, to the average particle diameter of the comminuted particles, $D_{50(comminuted\ particles)}$, on the other hand, is at least about 10:1, wherein the organically based matrix particles have a melting point or melting range in the range of from about 30° C. to about 350° C., wherein the organically based matrix particles have a glass transition temperature Tg in the range of from about −60° C. to about 200° C.

* * * * *